United States Patent
Dill

(10) Patent No.: US 10,473,137 B2
(45) Date of Patent: Nov. 12, 2019

(54) WINGED THREADED FASTENER

(71) Applicant: Illinois Tool Works Inc., Glenview, IL (US)

(72) Inventor: Michael C. Dill, Elk Grove Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 210 days.

(21) Appl. No.: 15/677,537

(22) Filed: Aug. 15, 2017

(65) Prior Publication Data

US 2018/0100533 A1    Apr. 12, 2018

Related U.S. Application Data

(60) Provisional application No. 62/405,560, filed on Oct. 7, 2016.

(51) Int. Cl.
*F16B 25/00* (2006.01)
*F16B 25/10* (2006.01)

(52) U.S. Cl.
CPC ...... *F16B 25/0031* (2013.01); *F16B 25/0084* (2013.01); *F16B 25/0089* (2013.01); *F16B 25/00* (2013.01); *F16B 25/103* (2013.01); *F16B 25/106* (2013.01)

(58) Field of Classification Search
CPC .............. F16B 25/0031; F16B 25/0084; F16B 25/0089; F16B 25/103; F16B 25/106; F16B 25/00
USPC ............. 411/386, 387.1, 387.2, 387.5, 387.8
See application file for complete search history.

(56) References Cited

U.S. PATENT DOCUMENTS

| | | | | |
|---|---|---|---|---|
| 3,358,548 A | * | 12/1967 | Dyslin | F16L 325/103 408/224 |
| 3,682,507 A | * | 8/1972 | Waud | F16B 5/0275 411/413 |
| 3,699,841 A | * | 10/1972 | Lanius, Jr. | F16B 25/0031 408/224 |

(Continued)

FOREIGN PATENT DOCUMENTS

| | | |
|---|---|---|
| DE | 44 01 908 | 8/1994 |
| EP | 0 307 119 | 3/1989 |

(Continued)

OTHER PUBLICATIONS

Teks #12 2-¾ in. Phillips Flat-Head Self Drilling Screws (40-Pack), retrieved from the Internet at http://www.homedepot.com/p/Teks-12-2-3-4-in-Phillips-Flat-Head-Self-Drilling-Screws-40-Pack-21384/100145370, on Oct. 4, 2017 (available before Aug. 15, 2017)(12 pages).

(Continued)

*Primary Examiner* — Roberta S Delisle
(74) *Attorney, Agent, or Firm* — Neal, Gerber & Eisenberg LLP

(57) ABSTRACT

The present disclosure provides various embodiments of a winged threaded fastener primarily suited to be used to connect a wooden object to a metal object. The fastener includes a head, a shank, a helical thread formation extending from the shank, a first wing extending from the shank, and a second wing extending from the shank. In various embodiments, the wings are offset along the longitudinal axis of the shank with respect to each other and are angled with respect the longitudinal axis of the shank.

20 Claims, 3 Drawing Sheets

(56) References Cited

U.S. PATENT DOCUMENTS

| | | | | |
|---|---|---|---|---|
| 3,982,464 | A * | 9/1976 | Sygnator | F16B 25/0031 411/418 |
| 4,655,661 | A * | 4/1987 | Brandt | F16B 25/0031 408/224 |
| 4,874,278 | A * | 10/1989 | Kawashita | F16B 25/0015 411/386 |
| 5,015,134 | A * | 5/1991 | Gotoh | F16B 25/0015 411/386 |
| 5,046,905 | A * | 9/1991 | Piacenti | F16B 25/0031 408/224 |
| 6,558,097 | B2 | 5/2003 | Mallet et al. | |
| 6,739,815 | B2 * | 5/2004 | Takasaki | F16B 25/0015 411/387.1 |
| 6,887,023 | B1 * | 5/2005 | Lu | F16B 25/0031 411/387.1 |
| 7,090,452 | B2 * | 8/2006 | Chen | F16B 25/0031 411/387.1 |
| 7,686,556 | B2 * | 3/2010 | Belinda | E04C 3/12 411/387.2 |
| 8,348,573 | B2 * | 1/2013 | Chang | F16B 25/0015 411/387.1 |
| 2007/0224019 | A1 * | 9/2007 | Hale | F16B 25/0015 411/387.2 |
| 2013/0309042 | A1 | 11/2013 | Chao | |

FOREIGN PATENT DOCUMENTS

| | | |
|---|---|---|
| EP | 0 407 093 | 1/1991 |
| EP | 2 151 590 | 2/2010 |
| JP | 61-6415 | 1/1986 |

OTHER PUBLICATIONS

Teks #10 1-7/16 in. Phillips Flat-Head Self-Drilling Screws (100-Pack), retrieved from the Internet at http://www.homedepot.com/p/Teks-10-1-7-16-in-Phillips-Flat-Head-Self-Drilling-Screws-100-Pack-21380/ 100160285, on Oct. 4, 2017 (available before Aug. 15, 2017)(15 pages).

International Search Report and Written Opinion from International Application No. PCT/US2017/048986, dated Nov. 22, 2017 (12 pages).

* cited by examiner

WINGED THREADED FASTENER

PRIORITY

This patent application claims priority to and the benefit of U.S. Provisional Patent Application Ser. No. 62/405,560, filed Oct. 7, 2016, the entire contents of which are incorporated herein by reference.

BACKGROUND

Various known fasteners have been employed throughout the world to attach wooden objects to metal objects. For example, various known fasteners have been used to attach wood, wooden, or wooded materials such as plywood or dimensional lumber (such as 1×2's or 2×4's) to steel framing members.

One problem with using various known fasteners to attach such wooden objects to metal objects is that the threads of the fastener continuously increase the torsional resistance on the fastener as the fastener is driven further and further into the wooden object. In other words, the engagement between the wood and the threads slows the rotation of the fastener. In various situations, by the time the fastener is driven through the entire thickness of the wooden object, the torsional resistance on the threads of the fastener is so substantial that it can be difficult to place enough torsional force on the fastener to drive the fastener into the metal object without breaking the fastener. This torsional resistance also slows or reduces the drill tip and point below the required revolutions per minute to effectively drill through the steel member adjacent to the wood. This results in an incomplete operation to drill through both materials and attach them together by the fastener.

To solve this problem, winged threaded fasteners have been developed. Various known winged threaded fasteners are commercially used throughout the world for securing wooden objects to metal objects. Typically, such known winged threaded fasteners include a head, a shank, threads or a thread formation on the shank, and two directly opposing wings extending from opposing sides of the shank. The head typically includes a mechanical engaging structure for engagement by a tool that is used to rotate the winged threaded fastener and drive the winged threaded fastener through the wooden object and into the metal object.

Such winged threaded fasteners are typically driven through the wooden object and into the metal object using a powered tool such as an electric or pneumatic power driving tool or impact driver that imparts a rotational force or torque on the winged threaded fastener. When such a known winged threaded fastener is positioned against the wooden object and rotated in a tightening direction, the opposing wings of the winged threaded fastener bore or ream a hole in the wooden object that is wider than the outer diameter of the threads of the winged threaded fastener. This prevents the threads of the fastener from engaging the inner-wall that defines the hole in the wooden object and thus reduces the torsional resistance on the threads of the fastener by the wooden object. This also assists in maintaining the appropriate rotational revolutions per minute for the drill point to penetrate through the metal object. This also avoids the problem of the drill point breaking down under the added force that can occur if the revolutions per minute are too low. When the fastener is driven through the wooden object and reaches the metal object, the drill point penetrates the metal object until the wings are reached. The wings are configured to break off when they engage the metal object and thus enable the threads of the fastener to engage the metal object and tap into the metal object as the fastener is driven into the metal object. When the driving process is complete, the head of the fastener engages the wooden object and the threads of the fastener engage the metal object, thereby creating a secure connection of the wooden object to the metal object.

However, certain problems exist with these known winged threaded fasteners.

The first problem with such known winged threaded fasteners is that in various instances, one or more of the wings do not break off when they reach the metal object. In such case, the wings which reach the metal object in unison also bore or ream a hole in the metal object and the threads of the fastener cannot engage or fully engage the metal object because the hole in the metal object is wider than the outer diameter of the threads of the fastener.

The second problem with such known winged threaded fasteners is that in various instances, wood chips or wood fibers remains in the hole in the wooden object created by the wings. In other words, the wings do not fully exhaust the wood chips or fibers from the hole. In such case, the wood chips or fibers fill the drill flute of the fastener which can cause the drill point to build up excessive heat and soften. This can prevent the point from further penetrating the metal object and can prevent complete or maximum fastening.

The third problem with such known winged threaded fasteners is related to the second problem. In various instances, wood chips or wood fibers remains in the hole in the wooden object created by the wings. In such case, the wood chips or fibers can also engage the threads of the fasteners and add torsional resistance to the fastener as it is driven through the wooden object. In various situations, by the time the fastener is driven through the entire thickness of the wooden object, the torsional resistance on the threads of the fastener is so substantial due to these wood chips or wood fibers in the hole that it is difficult to place enough torsional force on the fastener to drive the fastener into the metal object without breaking the fastener.

Accordingly, there is a need to provide winged threaded fasteners that solve these problems.

SUMMARY

The present disclosure relates generally to an improved winged threaded fastener. Various embodiments of the present disclosure provide an improved winged threaded fastener primarily configured to be drivable through a wooden object and into a metal object. In various embodiments, the improved winged threaded fastener includes wings that are offset and ramped or angled to solve each of the above problems. For brevity, the winged threaded fastener of the present disclosure may sometimes be referred to herein as the winged fastener, the threaded fastener, or the fastener.

In various embodiments of the present disclosure, the winged threaded fastener includes: (i) a head; (ii) a shank integrally connected to the head at a first end of the shank and forming or having a tip at a second end of the shank; (iii) one or more helical threads or thread formations integrally connected to or formed with and extending outwardly or transversely from the shank; (iv) a first wing integrally connected to or formed with and extending from the shank; and (v) a second wing integrally connected to or formed with and extending from the shank. The shank has a first portion adjacent to the head, a second portion adjacent to the tip, and a third portion between the first portion and the second portion. The shank has a longitudinal axis extending from the head to the tip.

In various embodiments of the present disclosure, the first wing and the second wing extend from the second portion of the shank at opposite sides of and at offset positions relative to each other along the length or longitudinal axis of the second portion of the shank. These offset positions enable the wings to separately break off sequentially instead of simultaneously. These offset positions reduce the forces necessary to break off each of the wings when that wing engages the metal object and thus enables each of the wings to break off separately. This substantially reduces or eliminates the likelihood that one or more of the wings will not break off as described above. Thus, this solves the problem of one or more of the wings remaining on the shank of the fastener and boring a hole in the metal object. This also enables the fastener of the present disclosure to be used on a metal object that has a relatively lower tensile strength which in turn broadens the application or uses of the fastener of the present disclosure.

In various embodiments of the present disclosure, one or more of the first wing and the second wing are ramped or extend at angles transverse to the longitudinal axis of the shank. These ramped or angled wings cause a more efficient removal and exhausting of the wood chips and fibers per revolution of the fastener from the hole in the wooden object created by the wings as the fastener is driven into the wooden object. These ramped or angled wings also thus reduce or prevent clogging of the hole and reduce or prevent clogging of the drill flute of the fastener and heating of the drill point.

Other objects, features, and advantages of the present disclosure will be apparent from the following detailed disclosure, taken in conjunction with the accompanying sheets of drawings, wherein like reference numerals refer to like parts.

DETAILED DESCRIPTION

Figure 1:
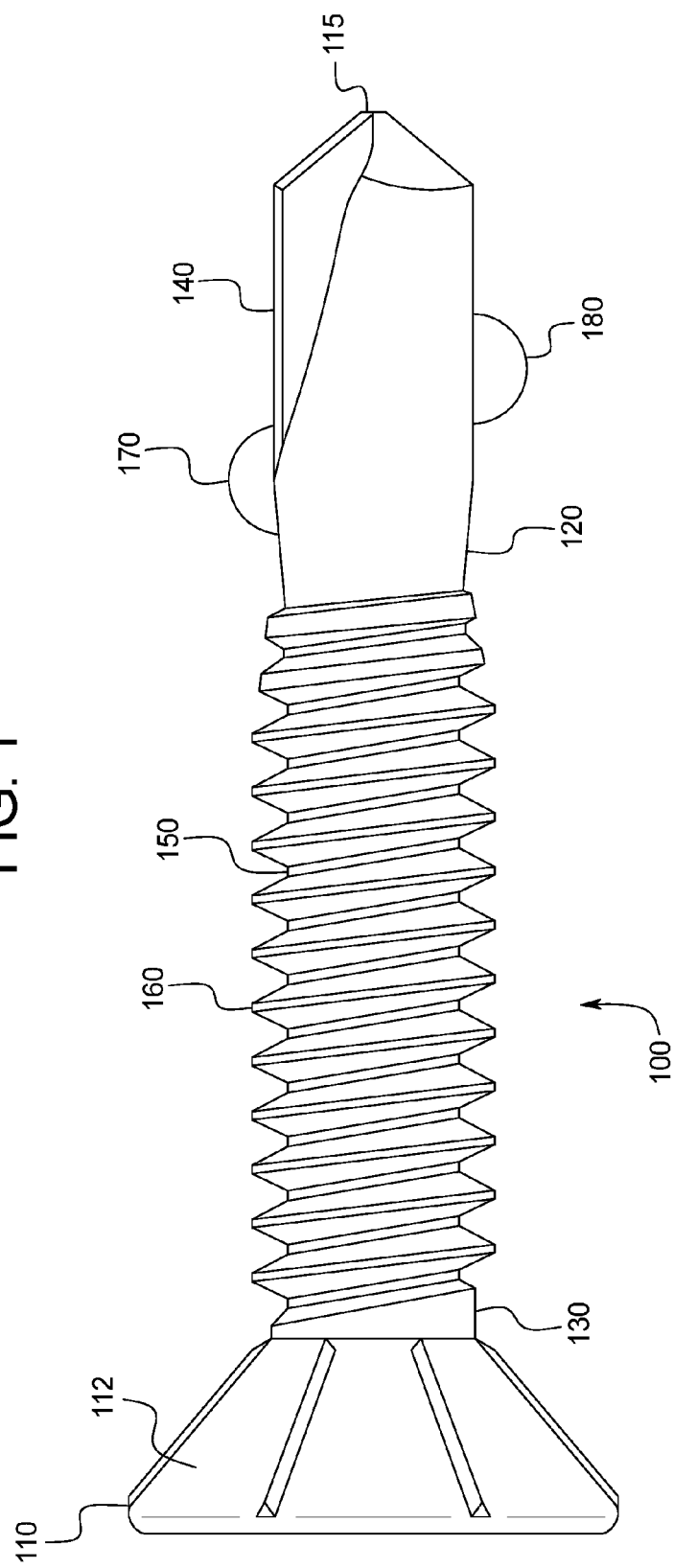
FIG. 1 is a first side view of one example embodiment of a winged threaded fastener of the present disclosure, and showing the wings at offset positions along the longitudinal axis of the shank.

Referring now to Figures, a winged threaded fastener 100 of one example embodiment of the present disclosure is generally shown in FIGS. 1, 2, 3, and 4. The fastener 100 is configured for use in fastening a wooden object (not shown) to a metal object (not shown).

The illustrated winged threaded fastener 100 generally includes: (a) a head 110; (b) a shank 120 integrally connected to the head 110 at a first end of the shank 120; (c) a helical thread or thread formation 160 integrally formed with and extending outwardly or transversely from the shank 120; (d) a first wing 170 integrally connected to and extending outwardly or transversely from the shank 120; and (v) a second wing 180 integrally connected to and extending outwardly or transversely from the shank 120. The fastener is made from a suitable steel in various embodiments, although it should be appreciated that the fastener may be made from other suitable materials such as other suitable metals.

The head 110 includes a tapered body 112 and a suitable tool engagement mechanism such as tool engagement mechanism 114 formed by the head 110. The head may be alternatively configured, sized, and shaped in accordance with the present disclosure.

The shank 120 has a tip 115, a first portion 130 adjacent to the head 110, a second portion 140 adjacent to the tip 115, and a third portion 150 between the first portion 130 and the second portion 140. The shank 120 has a longitudinal axis (not shown) extending from the head 110 to the tip 115. The shank 120 has a length L1 (not labeled) generally from the head 110 to the tip 115. The tip 115 is pointed in this illustrated embodiment to aid in penetrating the wooden object and the metal object into which the fastener 100 is driven. The second portion 140 of the shank 150 has an outer diameter D1 (not labeled). The third portion 150 of the shank 150 and the thread formation have an outer diameter D2 (not labeled). In this illustrated example embodiment, the outer diameter D2 is slightly greater than the outer diameter D1. The shank 120 may be alternatively configured, sized, and shaped in accordance with the present disclosure. The outer diameters of different portions of the shank may also vary in accordance with the present disclosure.

The helical threads or thread formation 160 extends outwardly or transversely from the third portion 150 of the shank 120. It should be appreciated that the threaded fastener of the present disclosure can include one or more additional helical threads or thread formations in accordance with the present disclosure. It should also be appreciated that the threaded fastener of the present disclosure can include one or more helical threads or thread formations with any suitable appropriate: (a) number of helical threads; (b) size; (c) orientation; (d) pitch; (e) spacing; or (f) configuration.

The first wing 170 and the second wing 180 extend from the second portion of the shank at opposite sides of and offset positions relative to each other along the length or longitudinal axis of the second portion 140 of the shank 120. These offset positions enable the wings 180 and 170 to break off sequentially instead of simultaneously as the wings 180 and 170 sequentially engage the metal object. These offset positions reduce the forces necessary to break off each of the wings 180 and 170 when the wings 180 and 170, respectively, sequentially engage the metal object. This substantially reduces or eliminates the likelihood that one or more of the wings 180 and 170 will not break off as with the known winged threaded fasteners. Thus, this solves the problem of one or more of the wings 180 and 170 remaining on the shank 120 and boring a hole in the metal object. This also enables the fastener 100 of the present disclosure to be used on metal object that have a lower tensile strength which in turn broadens the application or uses of the fastener of the present disclosure.

In this illustrated example embodiment, both of the wings extend out further than the diameter D2 of the threads such that they are configured to ream or bore a hole in the wooden object having an inner diameter wider than the outer diameter of the threads D2.

In various embodiments, the offset positions are such that the first wing and the second wing are partially overlapping along the longitudinal axis of the shank.

In other various embodiments, the offset positions are such that the first wing and the second wing do not partially overlap along the longitudinal axis of the shank.

In this illustrated embodiment, the shape of each of the wings 180 and 170 is generally semi-cylindrical. It should be appreciated that the wings can be formed with different shapes in accordance with the present disclosure. For example, in one alternative embodiment, the wings are semi-tear drop shaped such that they are wider toward the tip 115 and taper to a narrower thickness toward the third portion of the shank. It should also be appreciated that the wings do not need to be of or have identical shapes in accordance with the present disclosure.

It should also be appreciated that the wings do not need to be exactly opposite each other (relative to the sides of the shank).

Figure 2:
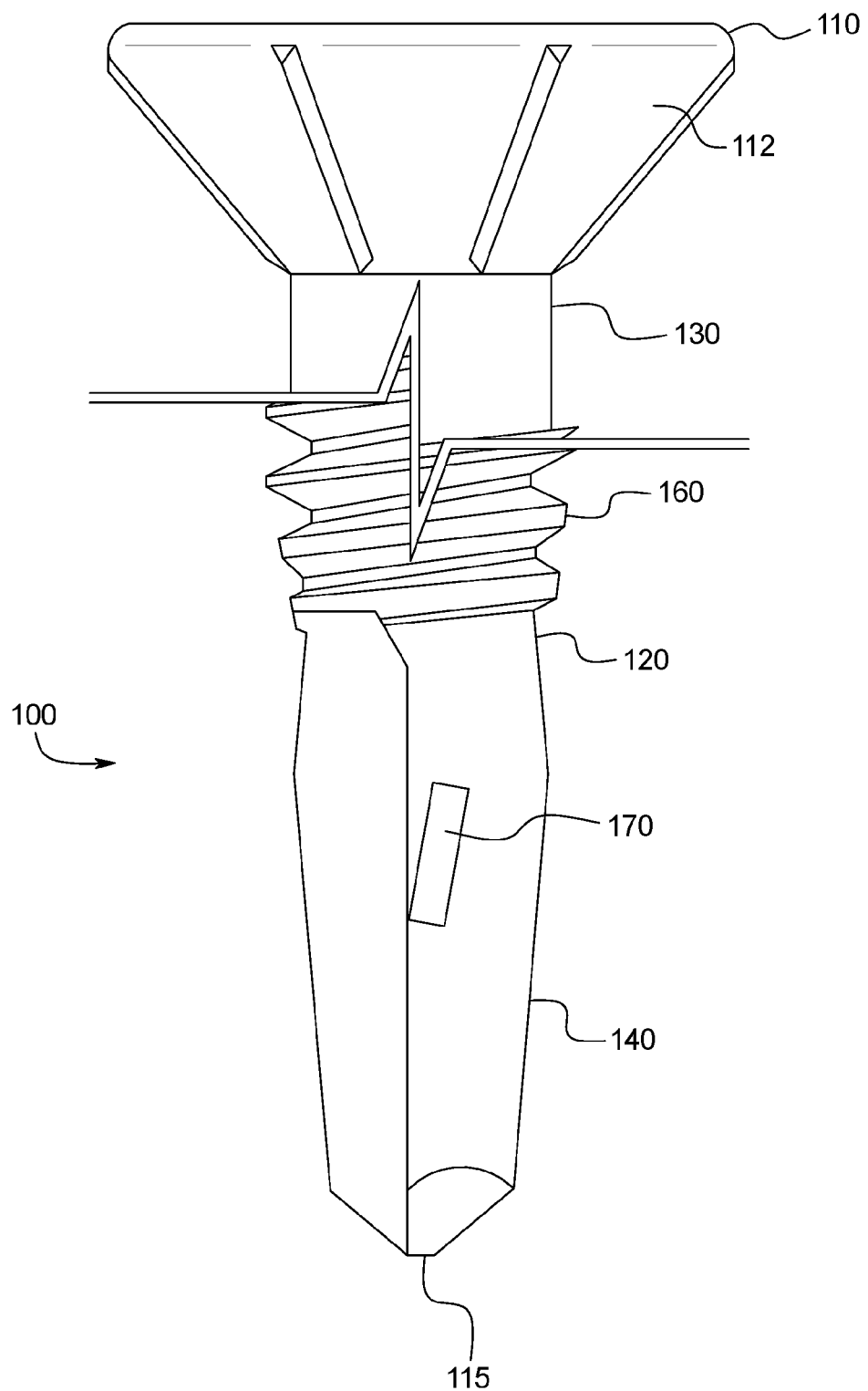
FIG. 2 is a second side view of the winged threaded fastener of FIG. 1, and showing one of the wings at an angled position relative to the longitudinal axis of the shank.
Figure 3:
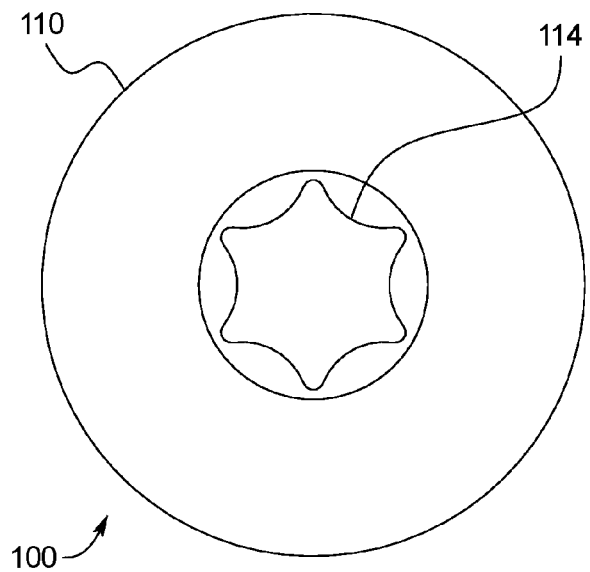
FIG. 3 is a first end view of the winged threaded fastener of FIG. 1, and showing the head of the winged threaded fastener of FIG. 1.
Figure 4:
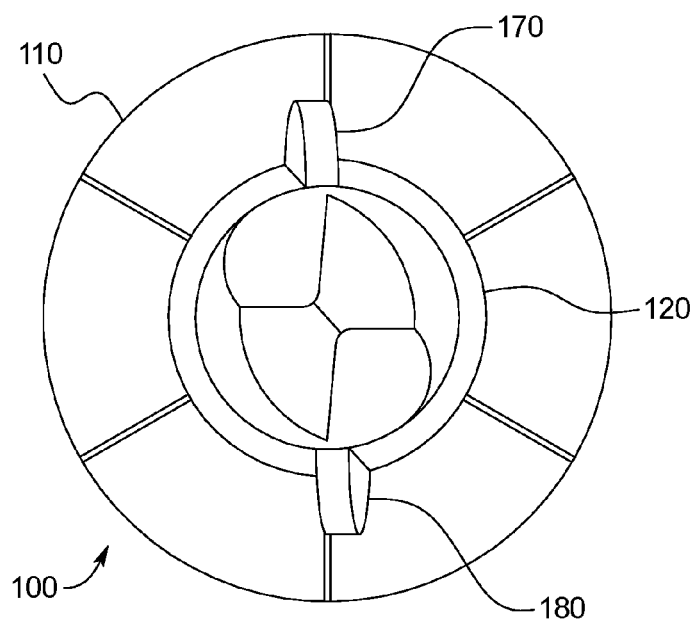
FIG. 4 is a second end view of the winged threaded fastener of FIG. 1, and showing the tip of the winged threaded fastener of FIG. 1.

The first wing 170 and the second wing 180 are each ramped or each extend at angle to or partially transversely from the longitudinal axis of the second portion of the shank 120 and particularly the second portion of the shank 140 as best shown in FIG. 2. In this illustrated embodiment, the angle is approximately 10 degrees offset from a plane that extends through and along the longitudinal axis of the shank 120. It should be appreciated that the angle at which the wings are positioned may vary in accordance with the present disclosure. It should be appreciated that the angles at which the wings are positioned may not be identical in accordance with the present disclosure.

These ramped or angled wings 170 and 180 cause a more efficient removal and exhausting of the wood chips and fibers per revolution of the fastener 100 from the hole in the wooden object that is created by the wings 170 and 180 as the fastener 100 is driven into the wooden object. These ramped or angled wings 170 and 180 also reduce or prevent clogging of the hole and reduce or prevent clogging of the drill flute of the fastener and heating of the drill point.

It should be appreciated that various structures and configurations of the winged threaded fastener of the present disclosure also reduce the likelihood of torsional failure or breakage of the fastener.

It should be appreciated that in alternative embodiments the winged threaded fastener has only one angled wing.

It should be appreciated that in alternative embodiments the winged threaded fastener has more than two offset wings.

It should be appreciated that in alternative embodiments the winged threaded fastener has more than two offset angled wings.

It should be appreciated that in various embodiments the fastener includes one or more flutes extending along the shank of the fastener.

It should be appreciated from the above that in various embodiments the present disclosure provides a fastener comprising: a head; a shank having a tip, a first portion adjacent the head, a second portion adjacent to the tip, and a third portion between the first portion and the second portion, the shank having a longitudinal axis extending from the head to the tip, a helical thread formation extending from the shank; a first wing extending from the second portion of the shank; and a second wing extending from the second portion of the shank, wherein the first wing and the second wing extend from the second portion of the shank at offset positions relative to each other along the longitudinal axis of the shank.

In various such embodiments of the fastener, the offset positions of the first wing and the second wing are overlapping along the longitudinal axis of the shank.

In various such embodiments of the fastener, the offset positions of the first wing and the second wing are not overlapping along the longitudinal axis of the shank.

In various such embodiments of the fastener, the first wing extends at a first angle relative to the longitudinal axis of the shank.

In various such embodiments of the fastener, the second wing extends at a second angle relative to the longitudinal axis of the shank.

In various such embodiments of the fastener, the first angle is approximately 10 degrees offset from a plane that extends through and along the longitudinal axis of the shank.

In various such embodiments of the fastener, the second angle is approximately 10 degrees offset from the plane that extends through and along the longitudinal axis of the shank.

In various such embodiments of the fastener, the first angle is approximately 10 degrees offset from a plane that extends through and along the longitudinal axis of the shank.

It should further be appreciated from the above that in various embodiments the present disclosure provides a fastener comprising: a head; a shank having a tip, a first portion adjacent the head, a second portion adjacent to the tip, and a third portion between the first portion and the second portion, the shank having a longitudinal axis extending from the head to the tip, a helical thread formation extending from the shank; a first wing extending from the second portion of the shank at a first angle relative to the longitudinal axis of the shank; and a second wing extending from the second portion of the shank at a second angle relative to the longitudinal axis of the shank.

In various such embodiments of the fastener, the first angle is approximately 10 degrees offset from a plane that extends through and along the longitudinal axis of the shank.

In various such embodiments of the fastener, the second angle is approximately 10 degrees offset from the plane that extends through and along the longitudinal axis of the shank.

In various such embodiments of the fastener, the first wing and the second wing extend from the second portion of the shank at offset positions relative to each other along the longitudinal axis of the second portion of the shank.

In various such embodiments of the fastener, the offset positions of the first wing and the second wing are overlapping along the longitudinal axis of the shank.

In various such embodiments of the fastener, the offset positions of the first wing and the second wing are not overlapping along the longitudinal axis of the shank.

It should further be appreciated from the above that in various embodiments the present disclosure provides a fastener comprising: a head; a shank having a tip, a first portion adjacent the head, a second portion adjacent to the tip, and a third portion between the first portion and the second portion, the shank having a longitudinal axis extending from the head to the tip, a helical thread formation extending from the shank; a first wing extending from the second portion of the shank at a first angle relative to the longitudinal axis of the shank; and a second wing extending from the second portion of the shank at a second angle relative to the longitudinal axis of the shank, wherein the first wing and the second wing extend from the second portion of the shank at offset positions relative to each other along the longitudinal axis of the shank, wherein the offset positions of the first wing and the second wing are overlapping along the longitudinal axis of the shank.

In various such embodiments of the fastener, the first angle is approximately 10 degrees offset from a plane that extends through and along the longitudinal axis of the shank.

In various such embodiments of the fastener, the second angle is approximately 10 degrees offset from the plane that extends through and along the longitudinal axis of the shank.

It should further be appreciated from the above that in various embodiments the present disclosure provides a fastener comprising: a head; a shank having a tip, a first portion adjacent the head, a second portion adjacent to the tip, and a third portion between the first portion and the second portion, the shank having a longitudinal axis extending from the head to the tip, a helical thread formation extending from the shank; a first wing extending from the second portion of the shank at a first angle relative to the longitudinal axis of the shank; and a second wing extending from the second portion of the shank at a second angle relative to the longitudinal axis of the shank, wherein the first wing and the second wing extend from the second portion of the shank at offset positions relative to each other along the longitudinal axis of the shank, wherein the offset positions of the first wing and the second wing are not overlapping along the longitudinal axis of the shank.

In various such embodiments of the fastener, the first angle is approximately 10 degrees offset from a plane that extends through and along the longitudinal axis of the shank.

In various such embodiments of the fastener, the second angle is approximately 10 degrees offset from the plane that extends through and along the longitudinal axis of the shank.

It will be understood that modifications and variations may be effected without departing from the scope of the novel concepts of the present invention, and it is understood that this application is to be limited only by the scope of the claims.

The invention is claimed as follows:

1. A fastener comprising:
a head;
a shank having a tip, a first portion adjacent the head, a second portion adjacent to the tip, and a third portion between the first portion and the second portion, the shank having a longitudinal axis extending from the head to the tip,
a helical thread formation extending from the shank;
a first wing extending from the second portion of the shank, the first wing having a semi-cylindrical shape; and
a second wing extending from the second portion of the shank, the second wing having a semi-cylindrical shape, wherein the first wing and the second wing extend from the second portion of the shank at offset positions relative to each other along the longitudinal axis of the shank, wherein the first wing or the second wing extends at an angle relative to the longitudinal axis of the shank.

2. The fastener of claim 1, wherein the offset positions of the first wing and the second wing are overlapping along the longitudinal axis of the shank.

3. The fastener of claim 1, wherein the offset positions of the first wing and the second wing are not overlapping along the longitudinal axis of the shank.

4. The fastener of claim 1, wherein the first wing extends at a first angle relative to the longitudinal axis of the shank.

5. The fastener of claim 4, wherein the second wing extends at a second angle relative to the longitudinal axis of the shank.

6. The fastener of claim 5, wherein the first angle is approximately 10 degrees offset from a plane that extends through and along the longitudinal axis of the shank.

7. The fastener of claim 6, wherein the second angle is approximately 10 degrees offset from the plane that extends through and along the longitudinal axis of the shank.

8. A fastener comprising:
a head;
a shank having a tip, a first portion adjacent the head, a second portion adjacent to the tip, and a third portion between the first portion and the second portion, the shank having a longitudinal axis extending from the head to the tip,
a helical thread formation extending from the shank;
a first wing extending from the second portion of the shank at a first angle relative to the longitudinal axis of the shank, the first angle being approximately 10 degrees offset from a plane that extends through and along the longitudinal axis of the shank; and
a second wing extending from the second portion of the shank at a second angle relative to the longitudinal axis of the shank, the second angle being approximately 10 degrees offset from the plane that extends through and along the longitudinal axis of the shank.

9. The fastener of claim 8, wherein the first wing and the second wing extend from the second portion of the shank at offset positions relative to each other along the longitudinal axis of the second portion of the shank.

10. The fastener of claim 9, wherein the offset positions of the first wing and the second wing are overlapping along the longitudinal axis of the shank.

11. The fastener of claim 9, wherein the offset positions of the first wing and the second wing are not overlapping along the longitudinal axis of the shank.

12. The fastener of claim 8, wherein the first wing and the second wing each include a semi-cylindrical shape.

13. A fastener comprising:
a head including a tapered body;
a shank having a tip, a first portion adjacent to the tapered body of the head, a second portion adjacent to the tip, and a third portion between the first portion and the second portion, the shank having a longitudinal axis extending from the head to the tip,
a helical thread formation extending from the shank;
a first wing extending from the second portion of the shank at a first angle relative to the longitudinal axis of the shank; and
a second wing extending from the second portion of the shank at a second angle relative to the longitudinal axis of the shank, wherein the first wing and the second wing extend from the second portion of the shank at offset positions relative to each other along the longitudinal axis of the shank, wherein the offset positions of the first wing and the second wing are partially overlapping relative to each other along the longitudinal axis of the shank.

14. The fastener of claim 13, wherein the first angle is approximately 10 degrees offset from a plane that extends through and along the longitudinal axis of the shank.

15. The fastener of claim 14, wherein the second angle is approximately 10 degrees offset from the plane that extends through and along the longitudinal axis of the shank.

16. The fastener of claim 13, wherein the first wing and the second wing each include a semi-cylindrical shape.

17. A fastener comprising:
a head including a tapered body;
a shank having a tip, a first portion adjacent to the tapered body of the head, a second portion adjacent to the tip, and a third portion between the first portion and the second portion, the shank having a longitudinal axis extending from the head to the tip,
a helical thread formation extending from the shank;
a first wing extending from the second portion of the shank at a first angle relative to the longitudinal axis of the shank; and a second wing extending from the second portion of the shank at a second angle relative to the longitudinal axis of the shank, wherein the first wing and the second wing have a same shape as each other and the first wind and the second wind extend from the second portion of the shank at offset positions relative to each other along the longitudinal axis of the shank, wherein the offset positions of the first wing and the second wing are not overlapping along the longitudinal axis of the shank.

18. The fastener of claim 17, wherein the first angle is approximately 10 degrees offset from a plane that extends through and along the longitudinal axis of the shank.

19. The fastener of claim 18, wherein the second angle is approximately 10 degrees offset from the plane that extends through and along the longitudinal axis of the shank.

20. The fastener of claim 17, wherein the first wing and the second wing each include a semi-cylindrical shape.

* * * * *